Aug. 9, 1927.

L. KIRSCHBRAUN ET AL 1,638,162

VALVE

Original Filed Nov. 1, 1920

Inventors,
Lester Kirschbraun
Robert T. Pollock
By Frank L. Belknap, Atty.

Witness,
S. S. Mann

Patented Aug. 9, 1927.

1,638,162

UNITED STATES PATENT OFFICE.

LESTER KIRSCHBRAUN, OF CHICAGO, ILLINOIS, AND ROBERT T. POLLOCK, OF BOSTON, MASSACHUSETTS, ASSIGNORS TO UNIVERSAL OIL PRODUCTS COMPANY, OF CHICAGO, ILLINOIS, A CORPORATION OF SOUTH DAKOTA.

VALVE.

Application filed November 1, 1920, Serial No. 421,205. Renewed March 11, 1926.

This invention relates to improvements in valves and refers more particularly to a valve adapted for use under high temperature and pressure conditions.

Among its salient objects are to provide a valve construction adapted to withstand the high temperature and pressure conditions and at the same time maintain a pressure-tight connection; to provide a valve construction which has a double seat arrangement, both seats being kept constantly flushed clean and, due to the ball and socket connection between the valve stem and valve, adaptable to seat the valve in a pressure-tight manner when in an open or closed position; to provide a valve which seals the stem and stem packing when in an open position from all pressure, thus obviating constant trouble and inconvenience experienced with leakage and renewals caused from this source of difficulty, and to provide a valve construction particularly adaptable to systems and apparatus in which liquids and gas are handled under high pressure and temperatures, such as the operations having to do with the cracking of hydrocarbon oils.

Figures 1, 2:
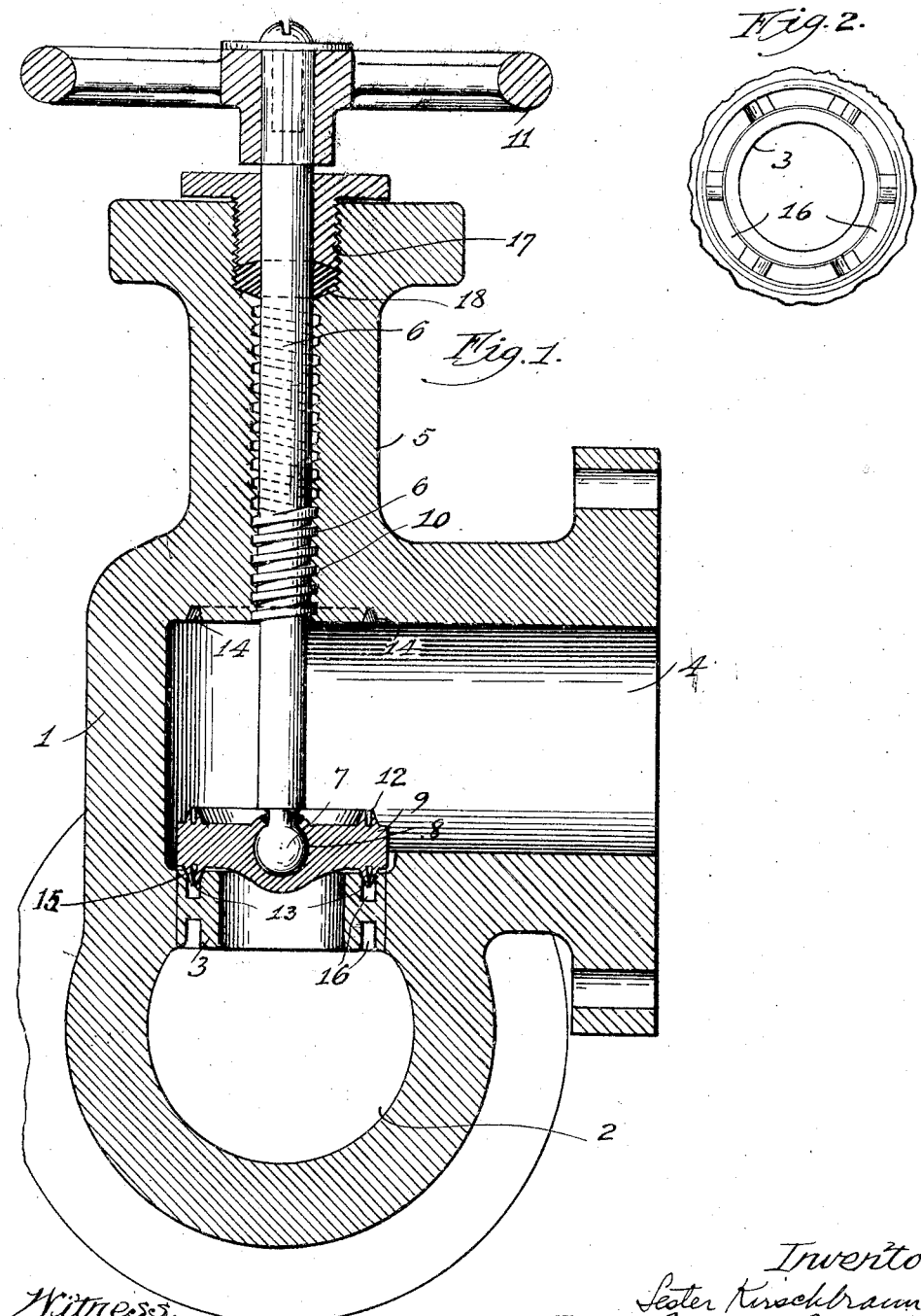
Figure 1 is a sectional side view, showing the details of the interior of the valve.
Fig. 2 is a plan detail of the valve seat member showing the flushing means.

Various types of valves have been used in connection with pipe lines where liquids or gases are conveyed and certain special valve constructions have been adopted where particular types of liquid or gases are to be handled. High degrees of heat and high pressures are important factors, which must be considered in valve construction. The design of the valve hereinafter disclosed is particularly adapted to be used in pipe lines or conduits where high degrees of heat are present and high pressures are common.

The particular function of this valve is to restrict the high pressure and heat to the shell of the conduit or pipe line and to prevent any leakage of gases or liquids up the valve stem where high pressures and temperatures have an opportunity to attack the valve stem packing, causing leakage and necessitating frequent renewals of the packing and, in addition, a corrosive effect upon the valve parts.

Referring to the drawings, the valve casing 1 comprises a lower inlet duct 2 in the throat of which is mounted a constriction ring or seat member 3. An outlet duct 4 directs the liquid or gases to the connecting pipes (not shown) and in the neck of the casing 5 is screwed a stem 6 upon whose lower end is formed a ball 7 fitting in a socket 8 in the valve member 9. The stem 6 is threaded with a heavy square thread which, with the rotation of the valve stem caused by the turning of the hand wheel 11, raises and lowers the valve member 9 to any desired position. The valve member 9 is constructed with an upper seat 12 and a lower seat 13. The seats are identical in construction, consisting in a circular V-shaped or wedge shaped ridge extending around the upper and lower surfaces of the valve member near its circumference. This ridge is slotted, forming bifurcated portions, which are adapted to fit in the V-shaped or wedge shaped recesses 14 and 15. The slots in these ridges form two comparatively narrow resilient sides to the respective ridges 12 and 13 which, when seated in the wedge shaped recesses 14 and 15 are crowded together producing a pressure-tight seat closure or sealing means.

The valve, when in an open position, has the ridge 12 fitted into the seat 14, while in a closed position the ridge 13 seats within the wedge shaped seat 15, as shown in Fig. 1. When in an open position the gases or liquids conveyed through the pipes under high pressure are prevented from passing up along the valve stem, due to the pressure-tight engagement of the upper ridge 12 with the seat 14.

It will be noted that, due to the ball and socket connection of the valve stem with the valve member 9, any slight irregularity, due to a collection of foreign substances in the wedge shaped seats, or any untrueness of the valve member or stem will be compensated for by this universal connection. The ring 3 is adjusted in the neck of the lower inlet portion 2 of the casing 1 and has in its ends communicating ducts 16. These ducts are in communication with the valve seats 15 and serve to flush out the same when the valve is in an open position and to prevent the collection of any foreign substances beneath the valve when it is seated in its lower seat. The upper seat will be kept clean, due to the fact that very little foreign material will cling to the inverted wedge-shaped seat. Above the thread on the valve stem is screwed a packing gland 17, which holds the packing 18 in position and seals the valve stem against any leakage, which might occur in the opening and closing of the valve.

This valve, although particularly adapted for use where the pipe lines are to be kept completely open or closed, may be, however, used where only a partial opening is required. However, where the valve is only partially opened and high pressures are confined within the pipes or conduits, the valve stem will not be as securely sealed against leakage as when the valve is in an open position.

A more satisfactory fit of the valve and seats may be obtained by differing the taper of the valve seats and the ridge portions 12 and 13 of the valve member. By making the angle of the wall of the valve seats more obtuse than the ridges in the valve members, which are seated in said seats when the valve member is seated, the bifurcated ends will be pressed tighter and the seating of the valve thereby made pressure tight.

The invention is not restricted to the details of the drawings other than is hereinafter set out in the claims.

We claim as our invention:

1. In a pressure valve, the combination with a valve pivotally mounted upon a valve stem in a valve chamber and having protrusions on its upper and lower surfaces, of upper and lower annular wedge-shaped recesses in said chamber the lower recess constituting the valve seat, said upper and lower recesses adapted to receive the similarly-shaped protrusions on the upper and lower surfaces of the valve to insure a pressure-tight closure when the valve is shut and prevent leakage about the valve stem when the valve is in an open position, a duct communicating with the opening surrounded by the valve seat for removing deleterious substances accumulating therein.

2. In a pressure valve, the combination with a valve chamber, a valve pivotally mounted upon a valve stem in said chamber, said valve having bifurcated protruding wedge-shaped annular ridges on its upper and lower surfaces, upper and lower annular wedge shaped recesses adapted to receive the bifurcated protruding wedge shaped ridges when the valve is opened and closed respectively, insuring a pressure-tight closure when the valve is seated on its seat and preventing leakage about the valve stem when the valve is in open position, the lower wedge-shaped recess constituting the valve seat.

3. In a pressure valve, the combination with a valve chamber of a valve pivotally mounted upon a valve stem in the valve chamber, said valve having bifurcated protruding annular ridges on its upper and lower surfaces, upper and lower annular wedge-shaped recesses in said chamber adapted to receive said ridges, the lower wedge shaped recess surrounding the passage through the valve and an annular duct communicating with said lower recess and adapted to drain and flush the same.

4. In a pressure valve, the combination with a valve chamber, of a valve pivotally mounted upon a valve stem in said valve chamber, said valve having bifurcated protruding wedge shaped annular ridges on its upper and lower surfaces, upper and lower annular wedge-shaped recesses in the valve chamber adapted to receive said ridges, the wall of the lower recess constituting the valve seat, and an annular duct communicating with said lower recess and adapted to flush the valve seat.

5. In a pressure valve, the combination with a valve chamber, provided with a valve stem, a valve member movably mounted thereon, said valve member having bifurcated protruding portions on its surfaces and the wall of said valve chamber having corresponding recesses adapted to receive the respective protruding portions in the open and closed positions of the valve, and means for flushing the valve seat.

LESTER KIRSCHBRAUN.
ROBERT T. POLLOCK.